United States Patent
Xu et al.

(10) Patent No.: US 10,311,727 B2
(45) Date of Patent: Jun. 4, 2019

(54) METHOD AND DEVICE FOR INFORMATION IDENTIFICATION

(71) Applicant: ZTE Corporation, Shenzhen (CN)

(72) Inventors: Hui Xu, Shenzhen (CN); Zijiang Ma, Shenzhen (CN); Yaying Wang, Shenzhen (CN); Yong Lv, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 3 days.

(21) Appl. No.: 15/539,214

(22) PCT Filed: Jun. 25, 2015

(86) PCT No.: PCT/CN2015/082384
§ 371 (c)(1),
(2) Date: Jun. 23, 2017

(87) PCT Pub. No.: WO2016/101569
PCT Pub. Date: Jun. 30, 2016

(65) Prior Publication Data
US 2017/0358206 A1    Dec. 14, 2017

(30) Foreign Application Priority Data
Dec. 25, 2014 (CN) .......................... 2014 1 0828592

(51) Int. Cl.
*G08G 1/0967* (2006.01)
*H04W 4/12* (2009.01)

(52) U.S. Cl.
CPC ............ *G08G 1/0967* (2013.01); *H04W 4/12* (2013.01); *Y02D 70/00* (2018.01); *Y02D 70/1262* (2018.01); *Y02D 70/164* (2018.01)

(58) Field of Classification Search
None
See application file for complete search history.

(56) References Cited

U.S. PATENT DOCUMENTS 8,559,352 B2 * 10/2013 Kim ........................ H04W 4/50
370/312
9,313,770 B2 * 4/2016 Huschke ............. H04L 12/1881
(Continued)

FOREIGN PATENT DOCUMENTS

CN 101022345 A 8/2007
CN 101042807 A 9/2007
(Continued)

OTHER PUBLICATIONS

International Search Report for corresponding application PCT/CN2015/082384 filed on Jun. 25, 2015; dated Oct. 9, 2015.

*Primary Examiner* — Mohammed Rachedine
(74) *Attorney, Agent, or Firm* — Cantor Colburn LLP

(57) ABSTRACT

At least some embodiments of the disclosure include a method and device for information identification. In the method, a base station acquires a notification message about a start of a traffic information service, wherein the notification message carries a traffic information identifier and a timestamp, the traffic information identifier is a service identifier for indicating traffic information, and the timestamp indicates a time point when the base station sends MSI; and the base station sends the MSI according to the notification message, in which the MSI is indicative of position information and expansion information of a subframe where a MTCH corresponding to the traffic information is.

18 Claims, 8 Drawing Sheets

(56) References Cited

U.S. PATENT DOCUMENTS

| | | | |
|---|---|---|---|
| 2006/0176838 A1* | 8/2006 | Lee | H04L 12/189 370/312 |
| 2012/0116659 A1* | 5/2012 | Yuasa | G08G 1/096775 701/118 |
| 2013/0055318 A1* | 2/2013 | Wang | H04W 72/005 725/62 |

FOREIGN PATENT DOCUMENTS

| | | | |
|---|---|---|---|
| CN | 102387472 A | | 3/2010 |
| CN | 102143430 A | | 8/2011 |
| CN | 102256208 A | | 11/2011 |
| CN | 102982680 A | * | 3/2013 |
| CN | 103108040 A | * | 5/2013 |
| JP | 2011030211 A | | 2/2011 |
| WO | 2005048621 A1 | | 5/2005 |
| WO | 2013063483 A2 | | 5/2013 |

* cited by examiner

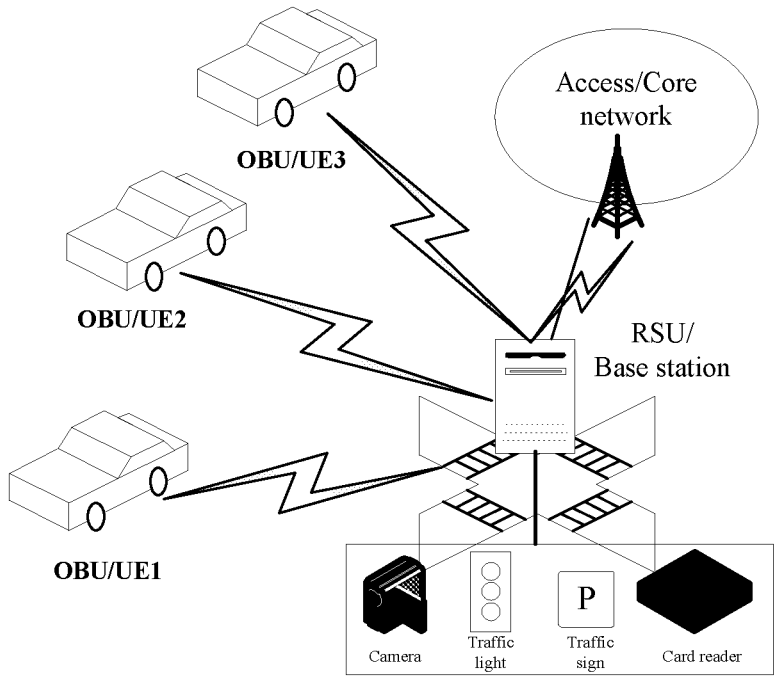

Fig. 1

A base station acquires a notification message about a start of a traffic information service. The notification message carries a traffic information identifier and a timestamp, the traffic information identifier is a service identifier for indicating traffic information, and the timestamp indicates a time point when the base station sends MSI — S202

The base station sends the MSI according to the notification message. The MSI is indicative of position information and expansion information of a sub-frame where an MTCH corresponding to the traffic information is — S204

Fig. 2

METHOD AND DEVICE FOR INFORMATION IDENTIFICATION

TECHNICAL FIELD

The disclosure relates to communication field, and in particular to a method and device for information identification.

BACKGROUND

With a rapid development of economic society, a possession quantity of cars in China is growing fast. Road traffic accidents occur frequently, which has become one of important factors that influence public sense of safety. And a problem of traffic safety has become one of basic problems that influence social harmony and improve people's livelihood. China is in urgent need to improve traffic safety from all aspects like technology, policy and education, in which improvement for a design of vehicle safety is an important component.

Technologies of improving vehicle safety can be mainly divided into a passive safety technology and an active safety technology. The passive safety technology is used for protecting people and goods inside and outside a vehicle after an accident. The active safety technology is used for preventing and reducing accidents of the vehicle, so as to prevent people from injury. The active safety technology is focus and trend of the development of modern vehicle safety technology.

By using an advanced wireless communication technology and a new-generation information processing technology, a communication-based collision warning system realizes real-time information interaction between vehicles and between vehicle and roadside infrastructure, informs current states (which may include: position, velocity, acceleration and driving route of each vehicle) and acquired road environment information, collaboratively senses danger conditions of road. Further the communication-based collision warning system also provides timely a variety of collision warning information, so as to prevent the occurrence of road traffic accident. The above has gradually become a new idea for each country to attempt to solve the problem of road traffic safety at present.

Internet of Vehicles refers to provide vehicle information at least one sensor loaded on a vehicle, at least one vehicle terminal and at least one electronic label, and adopt various communication technologies to realize interconnection between vehicles, between vehicle and people, and between vehicle and road. The Internet of Vehicles is used to extract and share information on an information network platform, effectively manage and control vehicles, and provide an integrated service. FIG. 1 is a schematic diagram of sending traffic and scheduling information to a vehicle through a network information platform according to the existing art.

In recent years, with a development of new mobile communication technologies, a research of using a Long Term Evolution (LTE) technology to solve the communication application based on Internet of Vehicles appears in the world.

With the rapid development of Internet and the popularization of multifunctional mobile terminal with large screen, there are a lot of mobile data multimedia services and a variety of high-bandwidth multimedia services, such as video conference, television broadcast, video on demand, advertisement, online education and interactive game. This rapid development not only satisfies the requirement of mobile subscribers for multiple services but also brings mobile operators a new service increasing point. These mobile data multimedia services require multiple subscribers to receive the same data simultaneously. And compared with common data services, the mobile data multimedia services have the characteristics of large volume of data, long duration, and being delay-sensitive.

In order to effectively use mobile network resources, the 3rd Generation Partnership Project (3GPP) puts forward a Multimedia Broadcast Multicast Service (MBMS). This service is a technology of transmitting data from a data source to multiple target mobile terminals, it realizes the sharing of network (including a core network and an access network) resources, and improves the utilization of network resources (especially an air interface resource). The MBMS service defined by 3GPP can not only realize multicast and broadcast of plain-text low-speed messages, but also realize multicast and broadcast of high-speed multimedia services. And the MBMS service provides a variety of video, audio and multimedia services, which assuredly complies with the trend of development of future mobile data, and provides a better service prospect for the development of a 3rd Generation Mobile Technology (3G).

Characteristics of the MBMS service are that the data volume of service is large, the duration of reception of a mobile terminal is long, and average data rate is constant. The above characteristics determine that configurations of both scheduling and control signaling of the MBMS service are semi-static. That is, both scheduling information and control signaling information of the MBMS service remain unchanged for a long time, and this information is sent periodically through an MBMS Control Channel (MCCH) and collectively called MCCH information. There may be multiple MCCHs in an evolved MBMS (eMBMS) system, and each MCCH corresponds to different Multimedia Broadcast Single Frequency Network (MBSFN) areas, and carries control information of the MBMS service sent by the corresponding MBSFN area.

An MBMS notification message is used for describing whether MCCH information changes. A User Equipment (UE) in a Radio Resource Control (RRC) idle mode or an RRC connected mode can get whether the MCCH information changes by monitoring the MBMS notification message, so that selective reception of the MCCH information is realized. That is, when the MCCH information changes, new MCCH information is received. Because the amount of information of the MBMS notification message is much less than that of the MCCH information, the selective reception of the MCCH information of the UE can effectively save resource and reduce power consumption. The MCCH notification message is carried on a Physical Downlink Control Channel (PDCCH) of the specified MBSFN sub-frame and sent periodically. Correspondingly the MBSFN sub-frame and sending period are indicated through a system message (SIB13).

Multiple Multicast Traffic Channels (MTCH) of the MBSFN service and the MCCH of the MBSFN service having the same MBSFN area can be multiplexed on a Multicast Channel (MCH). The MCCH and multiple MTCHs having the same MBSFN area, namely multiple logical channels, can be mapped on the same transmission channel MCH. The MCH can be carried through a transmission block of the MBSFN sub-frame.

An MSAP occasion is also introduced in a MSAP concept, which indicates that in a time period of a dynamic scheduling period, an MCH corresponding to a certain MSAP includes all multicast resources. In the MSAP occasion, multiple MTCHs and dynamic scheduling information can be sent, the MCCH can also be included, and the dynamic scheduling information is carried on a Control Element (CE) of an MAC Protocol Data Unit (PDU). A time length of the MSAP occasion can be 320 ms. The time length of the MSAP occasion is a scheduling period, which is also called a dynamic scheduling period. An MCH can distribute one or more MBSFEN sub-frames in at least one MBSFN frame through the MSAP, in which a sub-frame sent by using a multicast mode is called a MBSFEN sub-frame, and a frame containing the MBSFEN sub-frame is called a MBSFEN frame.

The dynamic scheduling information can be carried on each MSAP occasion configured for an MCH, and carries information of mapping from the MTCH to an assistant MSAP sub-frame. Mapping information is determined by virtue of an index relationship of MBSFN sub-frame numbers in a scheduling period. The UE can get that each MTCH is allocated on which MGSFN sub-frames by reading the scheduling information. Further the UE can read the MTCH of interest on the corresponding MBSFN sub-frame and ignore the MBSFN sub-frame that the UE has no need to read, so that the MBMS service receiving efficiency of the UE is enhanced, and the electrical power consumption of the UE is reduced. The MBSFN sub-frame numbers are determined by using the following way: all the MBSFN sub-frames that are allocated to an MCH in a scheduling period are arranged in a preset order and numbered in order.

An MAC control unit of MCH Scheduling Information (MSI) can be identified through an MAC PDU sub-header carrying a Logical Channel Identifier (LCID). The MAC control unit has a variable length, which is 2x bytes (x is the number of elements in the list MBMS-SessionInfoList). Each MTCH should contain the following domains:

(1) LCID: This domain indicates a logical channel ID of the MTCH, and has a length of 5 bits.

(2) Stop MTCH: This domain indicates a number of the corresponding MTCH end sub-frame in the MSAP occasion, and has a length of 11 bits. The specific stop MTCH value 2047 indicates that the corresponding MTCH is not scheduled, and the values from 2043 to 2046 are reserved.

When a certain MTCH in the MAC PDU does not send, the stop MTCH can be identified by 2047. When all the MTCHs do not have data, the MSI is still sent. If the MSI is not sent (there is an MBMS service indication in the MCCH), the UE considers that there is a failure in the eNB.

By using a characteristic of sending broadcast data to a service area of the MBMS technology, traffic condition, vehicle scheduling information and other information can be sent to an On Board Unit (OBU) in a service area, and vehicle receiving traffic information can select a road to advance.

However, in the current research and practice process, the following problem is provided, which includes that: the UE, which receives the MBMS service of interest, first receives a service notification, and acquires a service identity Temporary Mobile Group Identity (TMGI), service description, start time and other information according to the service notification. Then, the UE monitors an MCCH message, in which the shortest modifying period of the MCCH message is 5.12 seconds. In an environment of Internet of Vehicles, road traffic condition may change suddenly, for example, a traffic accident occurs, at the point, a notification cannot be sent in advance, then the UE cannot acquire the identity TMGI of the service required. Besides, because the time for updating the MCCH is too long, the UE monitors all the MCCH messages, which increases power consumption of the UE. At the same time, the UE cannot acquire needed traffic information.

SUMMARY

At least some embodiments of the disclosure include a method and device for information identification, so as at least to partially solve a problem that when road traffic condition changes suddenly, a UE needs to monitor all MCCH notification messages, so that power consumption of the UE is increased and the UE cannot acquire needed traffic information timely.

In an embodiment of the disclosure, a method for information identification is provided.

The method for information identification according to one embodiment of the disclosure includes that: acquiring, by a base station, a notification message about a start of a traffic information service, in which the notification message carries a traffic information identifier and a timestamp, the traffic information identifier is a service identifier for indicating traffic information, and the timestamp indicates a time point when the base station sends Multicast Channel Scheduling Information (MSI); and sending, by the base station, the MSI according to the notification message, in which the MSI is indicative of position information and expansion information of a sub-frame where a Multicast Traffic Channel (MTCH) corresponding to the traffic information is.

In one embodiment, sending, by the base station, the MSI according to the notification message includes: determining, by the base station, that a service is the traffic information service according to the traffic information identifier; and sending, by the base station, the MSI according to the timestamp.

In one embodiment, a reserved value of a Logical Channel Identifier (LCID) in the MSI is indicative of the traffic information service, in which the reserved value is 11101.

In one embodiment, the MSI which is indicative of the position information and the expansion information of the sub-frame where the MTCH corresponding to the traffic information is includes: a first MSI record and a second MSI record corresponding to the traffic information, in which the first MSI record is indicative of the position information of the sub-frame where the MTCH corresponding to the traffic information is, and the second MSI record is to adopt 3 bits in a stop MTCH domain corresponding to the traffic information to indicate the expansion information; the expansion information at least includes: a type of traffic information.

In another embodiment of the disclosure, another method for information identification is provided.

The method for information identification according to one embodiment of the disclosure includes that: receiving, by at least one of an On Board Unit (OBU) and a User Equipment (UE), Multicast Channel Scheduling Information (MSI) from a base station; and acquiring, by at least one of the OBU and the UE, traffic information on a Multicast Traffic Channel (MTCH) according to the MSI.

In one embodiment, acquiring, by at least one of the OBU and the UE, the traffic information on the MTCH according to the MSI includes: reading, by at least one of the OBU and the UE, MTCH data according to the MSI, and determining, by at least one of the OBU and the UE, that the traffic information on the MTCH is required traffic information according to location information of the traffic information contained in the MTCH data and information about a location where at least one of the OBU and the UE is.

In another embodiment of the disclosure, another method for information identification is provided.

The method for information identification according to one embodiment of the disclosure includes that: receiving, by at least one of an On Board Unit (OBU) and a User Equipment (UE), an expanded Multicast Control Channel (MCCH) message from a base station; and acquiring, by at least one of the OBU and the UE according to the MCCH message, Multicast Channel Scheduling Information (MSI) and traffic information on a required Multicast Traffic Channel (MTCH).

In one embodiment, acquiring, by at least one of the OBU and the UE according to the MCCH message, the MSI and the traffic information on the MTCH includes: determining, by at least one of the OBU and the UE, that the traffic information on the MTCH is the required traffic information according to a Temporary Mobile Group Identity (TMGI) carried in the MCCH message; and reading, by at least one of the OBU and the UE, the MSI and the traffic information on the MTCH.

In another embodiment of the disclosure, another method for information identification is provided.

The method for information identification according to one embodiment of the disclosure includes that: receiving a request message from at least one of an On Board Unit (OBU) and a User Equipment (UE); and responding to the request message, and sending Multicast Channel Scheduling Information (MSI) to at least one of the OBU and the UE, in which the MSI is indicative of position information and expansion information of a sub-frame where a Multicast Traffic Channel (MTCH) corresponding to traffic information is.

In one embodiment, the request message carries at least one of the followings: a traffic information identifier, which is indicative of the traffic information required by at least one of the OBU and the UE; an area of the traffic information, which is indicative of a geographical location where the traffic information occurs; and a time window, which is indicative of the traffic information acquired in the time window being useful information.

In another embodiment of the disclosure, another method for information identification is provided.

The method for information identification according to one embodiment of the disclosure includes that: selecting a vehicle to be scheduled; and sending traffic information to the vehicle to be scheduled.

In one embodiment, selecting the vehicle to be scheduled includes: receiving a request message from the vehicle to be scheduled; sending, according to the request message, vehicle demand information through multicast bearing; receiving a demand response message of the vehicle to be scheduled; and selecting the vehicle to be scheduled according to the demand response message, information about a location where the vehicle to be scheduled is and information about traffic condition of an area where the vehicle to be scheduled is.

In one embodiment, sending the traffic information to the vehicle to be scheduled includes: sending vehicle scheduling information to the vehicle to be scheduled, in which the vehicle scheduling information carries an identity of the vehicle to be scheduled; receiving a confirmation message from the vehicle to be scheduled; and sending the traffic information to the vehicle to be scheduled according to the confirmation message.

In another embodiment of the disclosure, a device for information identification is provided.

The device for information identification according to one embodiment of the disclosure includes: an acquiring component to acquire a notification message about a start of a traffic information service, in which the notification message carries a traffic information identifier and a timestamp, the traffic information identifier is a service identifier for indicating traffic information, and the timestamp indicates a time point when the base station sends Multicast Channel Scheduling Information (MSI); and a sending component to send the MSI according to the notification message, in which the MSI is indicative of position information and expansion information of a sub-frame where a Multicast Traffic Channel (MTCH) corresponding to the traffic information is.

In one embodiment, the sending component includes: a determining element to determine that a service is the traffic information service according to the traffic information identifier; and a sending element to send the MSI according to the timestamp.

In one embodiment, a reserved value of a Logical Channel Identifier (LCID) in the MSI is indicative of the traffic information service, in which the reserved value is 11101.

In another embodiment of the disclosure, another device for information identification is provided.

The device for information identification according to one embodiment of the disclosure includes: a receiving component to receive Multicast Channel Scheduling Information (MSI) from a base station; and an acquiring component to acquire traffic information on a Multicast Traffic Channel (MTCH) according to the MSI.

In one embodiment, the acquiring component is configured to read MTCH data according to the MSI, and determine that the traffic information on the MTCH is required traffic information according to location information of the traffic information contained in the MTCH data and information about a location where at least one of an On Board Unit (OBU) and a User Equipment (UE) is.

In another embodiment of the disclosure, another device for information identification is provided.

The device for information identification according to one embodiment of the disclosure includes: a receiving component to receive a Multicast Control Channel (MCCH) message from a base station; and an acquiring component to acquire Multicast Channel Scheduling Information (MSI) and traffic information on a required Multicast Traffic Channel (MTCH) according to the MCCH message.

In one embodiment, the acquiring component includes: a determining element to determine that the traffic information on the MTCH is the required traffic information according to a Temporary Mobile Group Identity (TMGI) carried in the MCCH message; and an acquiring element to read the MSI and the traffic information on the MTCH.

In another embodiment of the disclosure, another device for information identification is provided.

The device for information identification according to one embodiment of the disclosure includes: a receiving component to receive a request message from at least one of an On Board Unit (OBU) and a User Equipment (UE); and a processing component to respond to the request message, and send Multicast Channel Scheduling Information (MSI) to at least one of the OBU and the UE, in which the MSI is indicative of position information and expansion information of a sub-frame where a Multicast Traffic Channel (MTCH) corresponding to traffic information is.

In one embodiment, the request message carries at least one of the followings: a traffic information identifier, which is indicative of the traffic information required by at least one of the OBU and the UE; an area of the traffic information, which is indicative of a geographical location where the traffic information occurs; and a time window, which is indicative of that the traffic information acquired in the time window being useful information.

In another embodiment of the disclosure, another device for information identification is provided.

The device for information identification according to one embodiment of the disclosure includes: a selecting component to select a vehicle to be scheduled; and a sending component to send traffic information to the vehicle to be scheduled.

In one embodiment, the selecting component includes: a first receiving element to receive a request message from the vehicle to be scheduled; a first sending element to send, according to the request message, vehicle demand information through multicast bearing; a second receiving element to receive a demand response message of the vehicle to be scheduled; and a selecting element to select the vehicle to be scheduled according to the demand response message, information about a location where the vehicle to be scheduled is and information about traffic condition of an area where the vehicle to be scheduled is.

In one embodiment, the sending component includes: a second sending element to send vehicle scheduling information to the vehicle to be scheduled, in which the vehicle scheduling information carries an identity of the vehicle to be scheduled; a third receiving element to receive a confirmation message from the vehicle to be scheduled; and a fourth sending element to send the traffic information to the vehicle to be scheduled according to the confirmation message.

According to at least some embodiments of the disclosure, the base station acquires the notification message about the start of the traffic information service, in which the notification message carries the traffic information identifier and the timestamp, the traffic information identifier is the service identifier for indicating the traffic information, and the timestamp indicates the time point when the base station sends the MSI; and the base station sends the MSI according to the notification message, in which the MSI is indicative of the position information and the expansion information of the sub-frame where the MTCH corresponding to the traffic information is; in such a manner, the problem that when the road traffic condition changes suddenly, the UE needs to monitor all MCCH notification messages, so that the power consumption of the UE is increased, and the UE cannot acquire the needed traffic information timely is solved, thus reducing the power consumption for the OBU to acquire traffic and scheduling information, and realizing that the OBU receives the required traffic information timely.

BRIEF DESCRIPTION OF THE DRAWINGS

The accompanying drawings described here are used for providing a deeper understanding of the disclosure, and constitute a part of the application; schematic embodiments of the disclosure and description thereof are used for illustrating the disclosure and not intended to form an improper limit to the disclosure. In the accompanying drawings:

FIG. 1 is a schematic diagram of sending traffic and scheduling information to a vehicle through a network information platform.

FIG. 2 is a flowchart of a method for information identification according to an embodiment of the disclosure.

DETAILED DESCRIPTION

Figure 3:
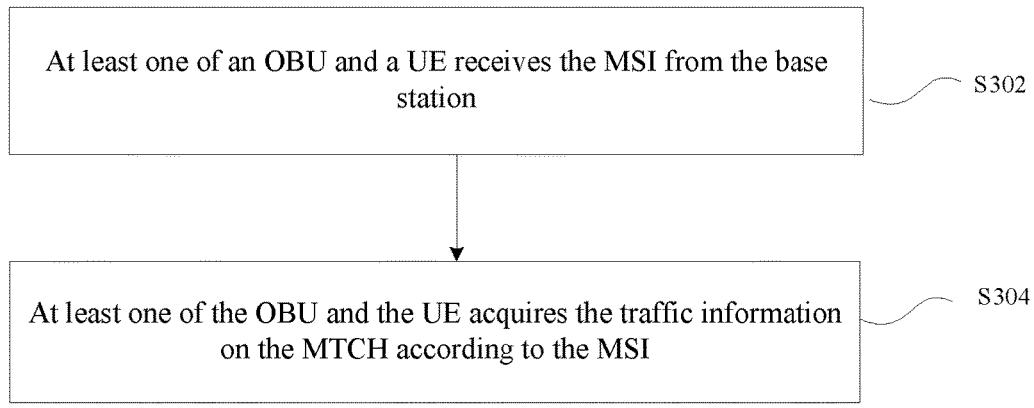
FIG. 3 is a flowchart of another method for information identification according to an embodiment of the disclosure.

The disclosure is elaborated below with reference to the accompanying drawings and embodiments. It should be noted that, embodiments of the disclosure and the characteristics in the embodiments can be combined under the condition of no conflicts.

FIG. 2 is a flowchart of a method for information identification according to an embodiment of the disclosure. As shown in FIG. 2, the method includes the following processing steps.

At step S202, a base station acquires a notification message about a start of a traffic information service. The notification message carries a traffic information identifier and a timestamp, the traffic information identifier is a service identifier for indicating traffic information, and the timestamp indicates a time point when the base station sends MSI.

At step S204, the base station sends the MSI according to the notification message. The MSI is indicative of position information and expansion information of a sub-frame where an MTCH corresponding to the traffic information is.

In some situations, when the road traffic condition changes suddenly, the UE needs to monitor all MCCH notification messages, so that the power consumption of the UE is increased and the UE cannot acquire the needed traffic information timely. By using the method shown in FIG. 2, for an unexpected traffic condition, a predetermined network element can notify the traffic information identifier and the timestamp to an eNB. Then, the eNB sends the MSI containing the traffic information identifier. Therefore, the problem that when the road traffic condition changes suddenly, the UE needs to monitor all MCCH notification messages, so that the power consumption of the UE is increased and the UE cannot acquire the needed traffic information timely is solved. The technical effect is to reduce the power consumption for the OBU to acquire traffic and scheduling information, and realize that the OBU receives the required traffic information timely.

In one embodiment, in step S204, that the base station sends the MSI according to the notification message includes the following operations.

At step S1, the base station determines that a service is the traffic information service according to the traffic information identifier.

At step S2, the base station sends the MSI according to the timestamp.

In an example implementation process, a reserved value of an LCID in the MSI can be indicative of the traffic information service. The reserved value can be 11101.

In an example implementation process, the MSI which is indicative of the position information and the expansion information of the sub-frame where the MTCH corresponding to the traffic information includes a first MSI record and a second MSI record corresponding to the traffic information. In an embodiment, the first MSI record is indicative of the position information of the sub-frame where the MTCH corresponding to the traffic information is. And the second MSI record is to adopt 3 bits in a stop MTCH domain corresponding to the traffic information to indicate the expansion information, which at least includes a type of traffic information.

FIG. 3 is a flowchart of another method for information identification according to an embodiment of the disclosure. As shown in FIG. 3, the method includes the following processing steps.

At step S302, at least one of an OBU and a UE receives the MSI from the base station.

At step S304, at least one of the OBU and the UE acquires the traffic information on the MTCH according to the MSI.

In one embodiment, in step S304, that at least one of the OBU and the UE acquires the traffic information on the MTCH according to the MSI may include the following operations.

At step S3, at least one of the OBU and the UE reads MTCH data according to the MSI, and determines that the traffic information on the MTCH is required traffic information according to the location information of the traffic information contained in the MTCH data and information about a location where at least one of the OBU and the UE is.

Figure 4:
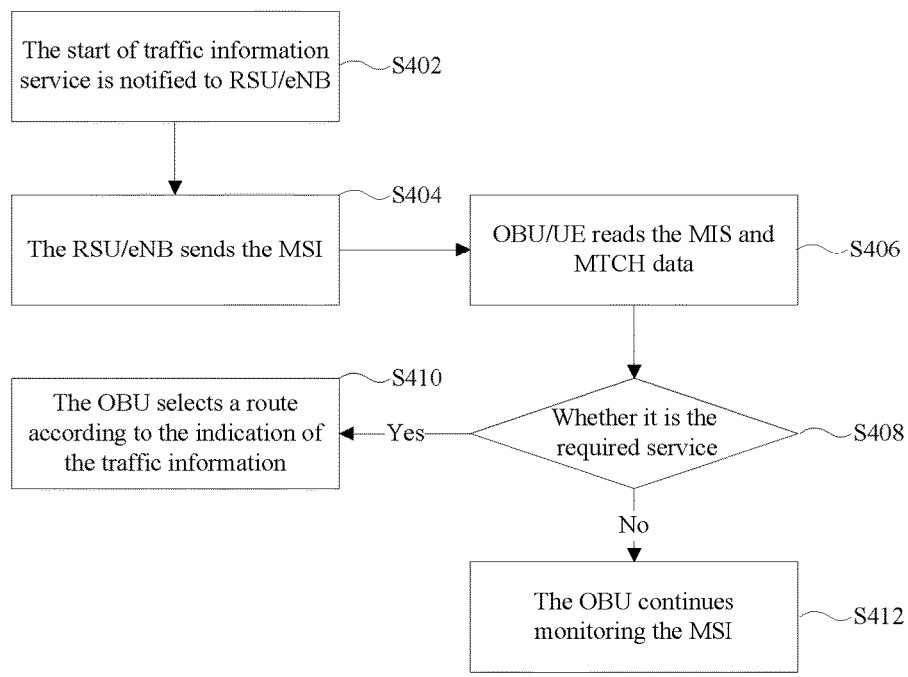
FIG. 4 is a flowchart aiming at an unexpected traffic condition according to an example embodiment of the disclosure.

As an example embodiment of the disclosure, FIG. 4 is a flowchart aiming at an unexpected traffic condition according to an example embodiment of the disclosure. As shown in FIG. 4, the flow includes the following steps.

At step S402, the traffic information center notifies the start of traffic information service to the eNB.

The traffic information center notifies the eNB through a route Broadcast Multicast-Service Center (BM-SC)→MBMS-GW→MME→MCE→eNB. And the notification can be realized by flow MBMS session start or MBMS session update. The MCE notifies the eNB at an M2 interface, and the notification at least includes a traffic information service identifier and a timestamp. The timestamp is indicative of the time point when the eNB sends the MSI. Furthermore, the notification also includes traffic information priorities, for example, high priority, medium priority and low priority, in which the high priority corresponds to traffic accidents, the medium priority corresponds to jams, and the low priority corresponds to normal road traffic.

The above notification can be realized through the MCE or OAM. The notification received by the eNB at least includes the traffic information service identifier and the timestamp. The traffic information service identifier is the specific service identifier for indicating the traffic information. For example, the specific TMGI or eNB can be understood as other identifier of the traffic information service. The timestamp is indicative of the time when the eNB sends the MSI.

At step S404, the eNB sends the MSI.

After receiving the notification sent by the MCE or OAM, the eNB can determine a service is the traffic information service according to the traffic information identifier.

The reserved value of the LCID in the MSI is used to indicate the traffic information service, in which the reserved value is 11101.

The eNB sends the MSI within the timestamp of the notification. The format of the MSI is shown in Table 1, in which 11101 is the traffic information service, in the latter three bits of the last column, P is the priority indication, and R is the reserved value.

TABLE 1

| LCID1 | | Stop MTCH1 | |
| Stop MTCH1 | | | |
| LCID2 | | Stop MTCH2 | |
| Stop MTCH2 | | | |
| 11101 | | Stop MTCH3 | |
| Stop MTCH3 | | | |
| 11101 | P1 | P2 | R |

Table 2 is an example of values of P1P2.

TABLE 2

| P1P2 | Priority |
| --- | --- |
| 00 | high |
| 11 | low |
| 01 or 10 | Medium |

Certainly, there can be other definitions of the values of P1P2. For example, if P1P2=11, the priority is high. A bit mapping method can also be adopted, For example, P1=1 means high priority, P1=0 means it is normal, P2=1 is vehicle request response information, and P2=0 is vehicle scheduling information The three bits P1, P2 and R can be defined according to actual needs.

The MSI containing the indication of the traffic information is sent repeatedly in valid time. The valid time is the time when the traffic information does not change. If the traffic information changes, correspondingly the MSI is also updated and sent.

At step S406, the OBU which is interested in receiving the traffic information reads the MTCH data according to the MSI indication.

The OBU which is interested in receiving the traffic information has been registered at the traffic information center and known the TMGI corresponding to the traffic information service.

The MTCH data corresponding to the traffic information contains the location information of the traffic information. The location information is indicative of the geographical location where the traffic information (e.g. traffic accidents and jams) occurs. The location information can be at least one of the followings: a cell identity, a service area identity, an MBSFN area identity, a tracking area identity, and a geographical coordinates.

At step S408, the OBU determines whether or not the traffic information is required for the OBU. When the traffic information is required for the OBU, turn to step S410; or else, turn to step S412.

The OBU reads the MTCH data corresponding to the traffic information, and determines whether the traffic information is required for the OBU according to the location information of the traffic information and the information about the location where the OBU is (e.g. according to the GPS or system broadcast). If the vehicle where the OBU is loaded is in the area of the traffic information or is about to go to the area of the traffic information, the traffic information is required for the OBU; or else, the traffic information is not required for the OBU.

At step S410, the vehicle selects a route according to the indication of the traffic information.

The OBU selects a route according to the road traffic condition. For example, the OBU selects a route with normal traffic condition, and avoids a route with traffic accidents or jams occurring.

At step S412, the OBU continues monitoring the MSI.

If the OBU determines that the traffic information is not required for the OBU, then the OBU continues monitoring the MSI.

Figure 5:
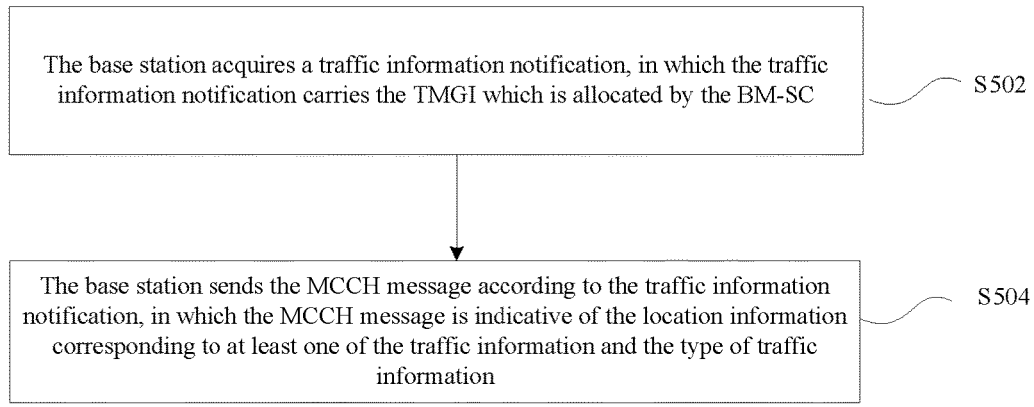
FIG. 5 is a flowchart of another method for information identification according to an embodiment of the disclosure.

FIG. 5 is a flowchart of another method for information identification according to an embodiment of the disclosure. As shown in FIG. 5, the method includes the following steps.

At step S502, the base station acquires a traffic information notification, in which the traffic information notification carries the TMGI which is allocated by the BM-SC.

At step S504, the base station sends the MCCH message according to the traffic information notification, in which the MCCH message is indicative of the location information corresponding to at least one of the traffic information and the type of traffic information.

For the normal traffic condition, it is possible to adopt the existing LCID value in the MSI. The traffic information center sends the service notification according to the existing flow. The OBU acquires the TMGI corresponding to the traffic information according to the service notification. The traffic information is indicated in the MCCH message, and the OBU monitors the MCCH message and the MSI, and acquires the needed MTCH data according to the MSI indication.

In one embodiment, in step S502, the base station can acquire the traffic information notification by one of the following ways:

way one: the base station receives the traffic information notification sent by the BM-SC; and way two: the base station receives the traffic information notification sent by the OBU, in which the traffic information notification is sent to the OBU by an application server.

Figure 6:
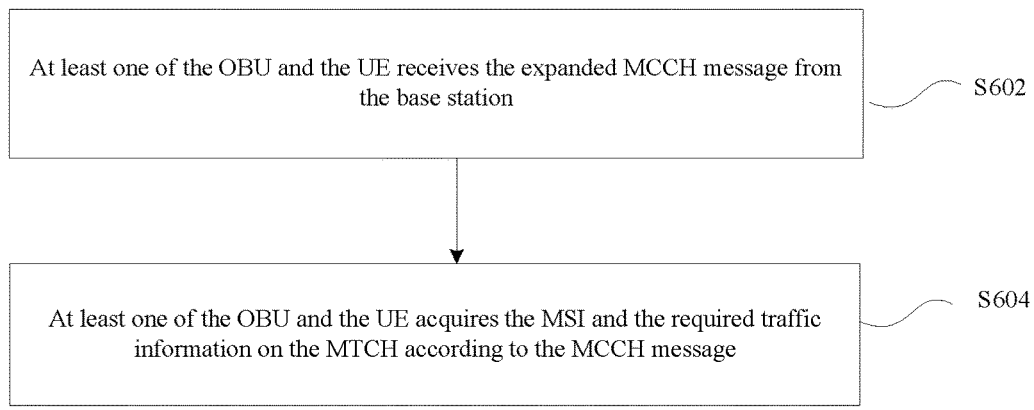
FIG. 6 is a flowchart of another method for information identification according to an embodiment of the disclosure.

FIG. 6 is a flowchart of another method for information identification according to an embodiment of the disclosure. As shown in FIG. 6, the method may include the following processing steps.

At step S602, at least one of the OBU and the UE receives the expanded MCCH message from the base station.

At step S604, at least one of the OBU and the UE acquires the MSI and the required traffic information on the MTCH according to the MCCH message.

In one embodiment, in step S604, that at least one of the OBU and the UE acquires the MSI and the traffic information on the MTCH according to the MCCH message includes the following operations.

At step S4, at least one of the OBU and the UE determines that the traffic information on the MTCH is the required traffic information according to the TMGI carried in the MCCH message.

At step S5, at least one of the OBU and the UE reads the MSI and the traffic information on the MTCH.

Figure 7:
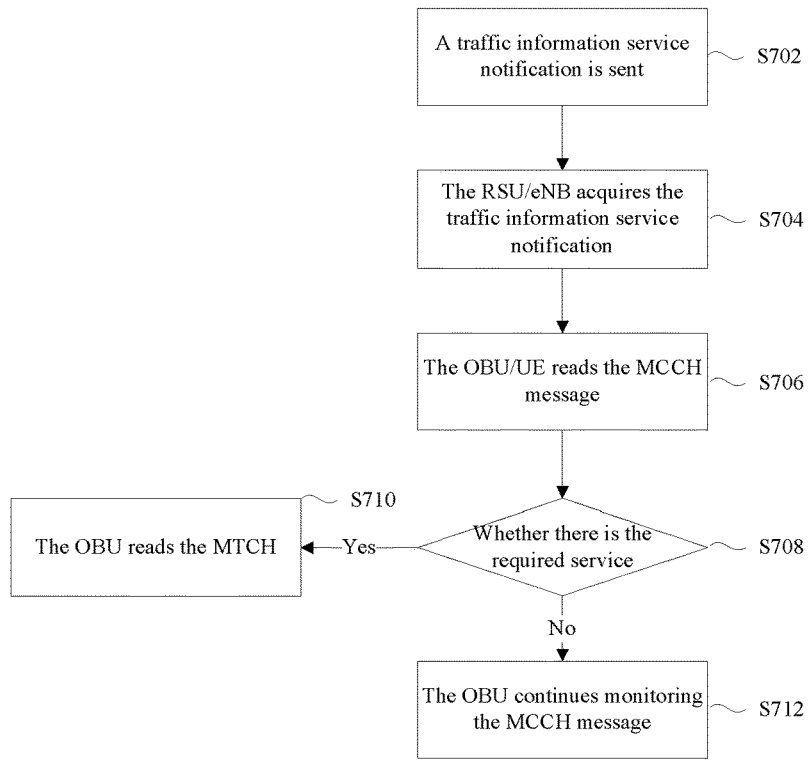
FIG. 7 is a flowchart aiming at normal traffic condition according to an example embodiment of the disclosure.

As another example embodiment of the disclosure, FIG. 7 is a flowchart aiming at normal traffic condition according to an example embodiment of the disclosure. As shown in FIG. 7, the flow includes the following steps.

At step S702, the traffic information center sends the traffic information notification.

The traffic information center is usually a server, and can be managed and maintained by an information provider (e.g. the traffic management department) or an operator. There is an interface between the traffic information center and the BM-SC, e.g. an MB2 interface.

The traffic information center may send the notification by many ways, for example, SMS, MMS, WAP, PUSH, and website push. It is needed to send the notification to the OBU or UE which has been registered at the center.

The above notification at least includes the TMGI of the traffic information and description of the traffic information. The TMGI can be allocated by the BM-SC.

At step S704, the base station acquires the traffic information notification.

The base station is all the eNBs in the area of the traffic information service. The eNB can acquire the notification by the following two ways:

way one: the traffic information center sends the notification to the eNB through the 3GPP network; and way two: the UE which has acquired the notification sends the notification to the eNB through air interface signaling.

At step S706, the OBU receiving the traffic information of interest monitors the MCCH message.

The MCCH message contains the location information of the traffic information TMGI. The location information is indicative of the geographical location where the traffic information (e.g. traffic accidents and jams) occurs. The location information can be at least one of the followings: the cell identity, the service area identity, the MBSFN area identity, the tracking area identity, and the geographical coordinates.

At step S708, the OBU determines whether or not the traffic information is required for the OBU. When the traffic information is required for the OBU, turn to step S710; or else, turn to step S712.

The OBU determines whether or not the traffic information is required for the OBU according to the value of the TMGI in the MCCH message. If the TMGI corresponding to the traffic information in which the OBU is interested appears in the MCCH message, the traffic information is required for the OBU.

At step S710, the OBU reads the MSI and the traffic information on the MTCH.

If the OBU determines the traffic information is required for the OBU, the OBU further reads the required traffic information on the MTCH according to the MCCH indication.

Table 3 is another mode of indicating the traffic information service.

TABLE 3

| | | | |
|---|---|---|---|
| LCID1 Stop MTCH1 | | Stop MTCH1 | |
| LCID2 Stop MTCH2 | | Stop MTCH2 | |
| LCID3 Stop MTCH3 | | Stop MTCH3 | |
| LCID3 | P1 | P2 | R |

Note that, the difference between Table 3 and Table 1 is that in Table 1, the reserved value 11101 of the LCID is adopted to indicate the traffic information service, and in Table 3, the LCID3 is adopted to indicate the traffic information. That is because in the present example embodiment, the corresponding value of LCID (LCID3) has been indicated through the MCCH message.

At step S712, the OBU continues monitoring the MCCH message.

If the OBU does not find the traffic information of interest, the OBU continues monitoring the MCCH message.

Figure 8:
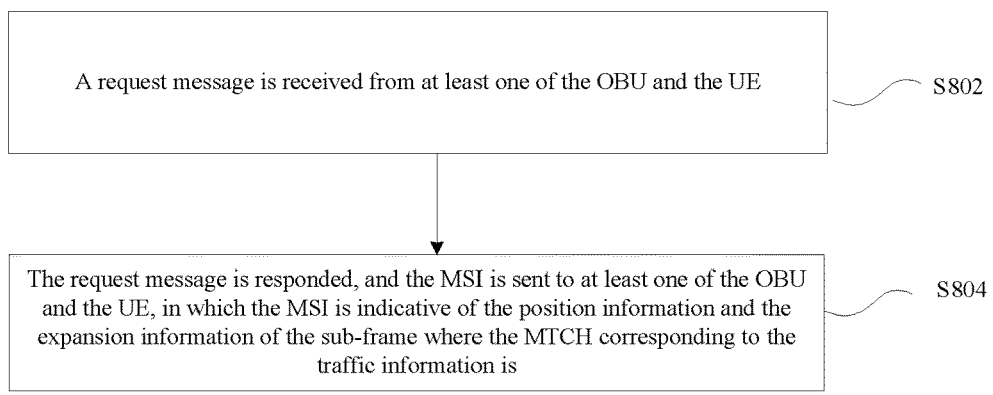
FIG. 8 is a flowchart of another method for information identification according to an embodiment of the disclosure.

FIG. 8 is a flowchart of another method for information identification according to an embodiment of the disclosure. As shown in FIG. 8, the method includes the following processing steps.

At step S802, a request message is received from at least one of the OBU and the UE.

At step S804, the request message is responded, and the MSI is sent to at least one of the OBU and the UE, in which the MSI is indicative of the position information and the expansion information of the sub-frame where the MTCH corresponding to the traffic information is.

For the scenario where the OBU requests the current traffic information, the OBU can sends a traffic condition request message to the traffic information center. And then the traffic information center sends the current traffic condition information to the OBU according to the traffic condition request message.

In an example implementation process, the information carried in the request message may include, but is not limited to, at least one of the followings:

(1) the traffic information identifier, which is indicative of the traffic information required by at least one of the OBU and the UE;

(2) the area of the traffic information, which is indicative of the geographical location where the traffic information occurs; and (3) the time window, which is indicative of that the traffic information acquired in the time window being useful information.

Figure 9:
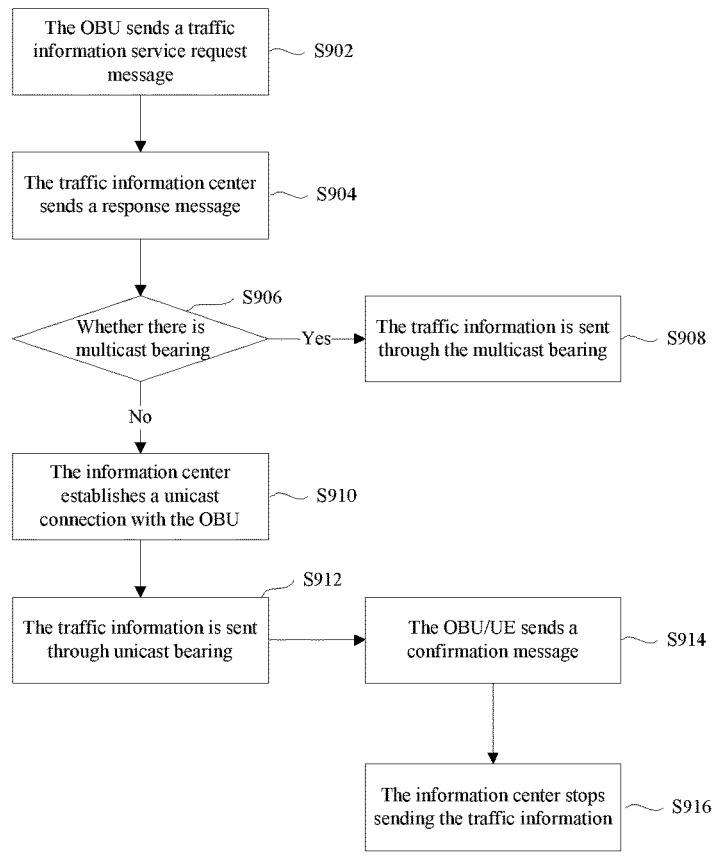
FIG. 9 is a flowchart that an OBU requests traffic condition information according to an example embodiment of the disclosure.

As another example embodiment of the disclosure, FIG. 9 is a flowchart that an OBU requests traffic condition information according to an example embodiment of the disclosure. As shown in FIG. 9, the flow includes the following steps.

At step S902, at least one of the OBU and the UE sends the request message to the traffic information center.

At least one of the OBU and the UE has been registered at the traffic information center.

The information carried in the request message includes the traffic information identifier. Moreover, the information may also include the area of traffic information and the time window. The traffic information identifier is the required traffic information, e.g. the TMGI. The area of traffic information is the geographical location where the traffic information occurs, and can include at least one of the followings: the cell identity, the service area identity, the MBSFN area identity, the tracking area identity, and the geographical coordinates. The time window means that the traffic information acquired in the window is useful information.

The above request message can be sent through at least one application layer signaling.

At step S904, the traffic information center returns the request response message to the OBU.

The request response message is indicative of that the traffic information center has received the request message, and can be sent through application layer signaling.

At step S906, the traffic information center determines whether there is multicast bearing. When there is multicast bearing, turn to step S908; or else, turn to step S910.

The traffic information center determines whether there is multicast bearing. When there is multicast bearing, the traffic information can be sent through the multicast bearing; or else, unicast bearing is established to send the traffic information.

At step S908, the traffic information center sends the traffic information through the multicast bearing.

The traffic information is sent through the MSI and the MTCH data. The traffic information is indicated by adopting the reserved value in the MSI, as shown in Table 4. The MTCH data may include the specific traffic information.

TABLE 4

| | | | |
|---|---|---|---|
| LCID1 Stop MTCH1 | | Stop MTCH1 | |
| LCID2 Stop MTCH2 | | Stop MTCH2 | |
| 11101 Stop MTCH3 | | Stop MTCH3 | |
| 11101 | P1 | P2 | R |

In Table 4, "P2=1" means that the traffic information is the information requested by the OBU. The OBU which has received the MSI can determine whether to continue reading the MTCH data corresponding to the traffic information, according to the indication of P2. If the OBU has sent the traffic information request message, it continues reading the MTCH data; or else, the OBU will not read the MTCH data.

At step S910, the traffic information center establishes the unicast bearing with the OBU.

The OBU enters an RRC connected mode, and establishes a unicast connection with the traffic information center.

At step S912, the traffic information center sends the traffic information through the unicast bearing.

At step S914, the OBU which has received the traffic information returns a confirmation message to the center.

The OBU can return the confirmation message on the unicast bearing.

At step S916, the traffic information center stops sending the traffic information.

After receiving the confirmation message returned by the OBU, the traffic information center stops sending the traffic information. In the time window, if the traffic information is updated, the traffic information center sends the updated traffic information to the OBU. If the time window expires, the traffic information center stops sending the traffic information and releases the unicast bearing to the OBU.

Figure 10:
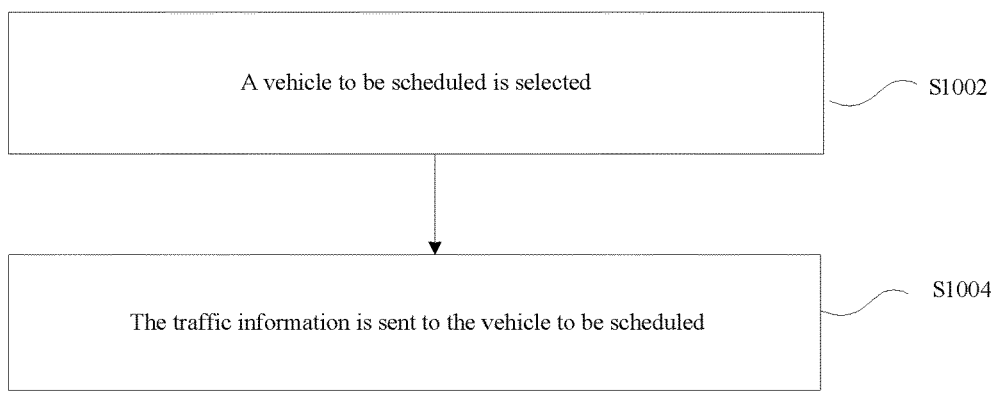
FIG. 10 is a flowchart of another method for information identification according to an embodiment of the disclosure.

FIG. 10 is a flowchart of another method for information identification according to an embodiment of the disclosure. As shown in FIG. 10, the method includes the following processing steps.

At step S1002, a vehicle to be scheduled is selected.

At step S1004, the traffic information is sent to the vehicle to be scheduled.

Aiming at the scenario where the traffic information center sends the vehicle scheduling information, the traffic information center can send the scheduling information to the area, and the OBU sends a response message. The traffic information center selects the vehicle meeting the condition and sends the traffic information.

In one embodiment, in step S1002, that the vehicle to be scheduled is selected includes the following operations.

At step S6, a request message is received from the vehicle to be scheduled.

At step S7, vehicle demand information is sent through the multicast bearing according to the request message.

At step S8, a demand response message of the vehicle to be scheduled is received.

At step S9, the vehicle to be scheduled is selected according to the demand response message, information about the location where the vehicle to be scheduled is and information about traffic condition of the area where the vehicle to be scheduled is.

In one embodiment, in step S1004, that the traffic information is sent to the vehicle to be schedule includes the following steps.

At step S10, the vehicle scheduling information is sent to the vehicle to be scheduled, in which the vehicle scheduling information carries the identity of the vehicle to be scheduled.

At step S11, a confirmation message is received from the vehicle to be scheduled.

At step S12, the traffic information is sent to the vehicle to be scheduled according to the confirmation message.

Figure 11:
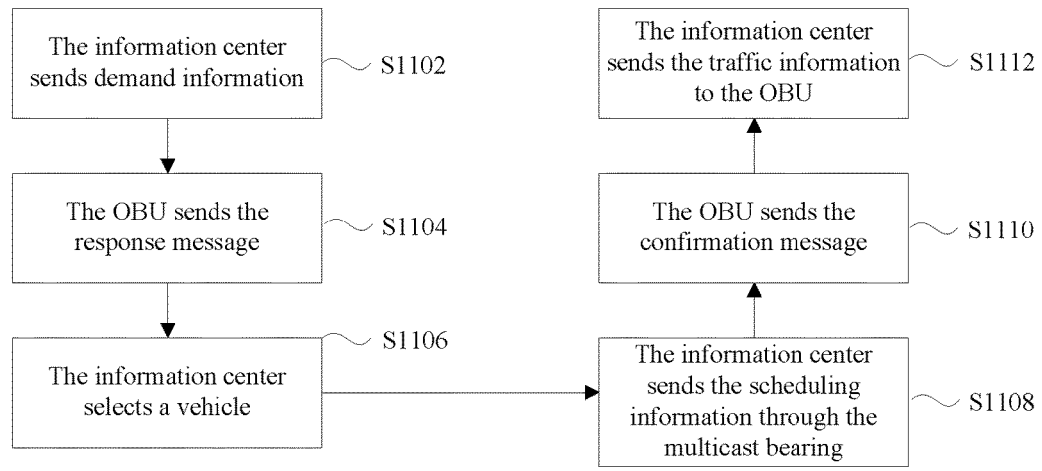
FIG. 11 is a flowchart that a traffic information center sends vehicle scheduling information according to an example embodiment of the disclosure.

As another example embodiment of the disclosure, FIG. 11 is a flowchart that a traffic information center sends vehicle scheduling information according to an example embodiment of the disclosure. As shown in FIG. 11, the flow includes the following steps.

At step S1102, the traffic information center can send the vehicle demand information through the multicast bearing.

After receiving the vehicle request message at some place, the traffic information center sends the vehicle demand information in the area of request. The vehicle demand information can be sent through the multicast bearing. The traffic information center can send the demand information to the eNB through the MCE or OAM, in which the demand information sent to the eNB by the MCE or OAM at least includes the information identifier and the timestamp. The timestamp indicates the time when the eNB sends the MSI. The MSI corresponding to the demand information is shown in Table 5.

TABLE 5

| LCID1 | | Stop MTCH1 | |
| Stop MTCH1 | | | |
| LCID2 | | Stop MTCH2 | |
| Stop MTCH2 | | | |
| 11101 | | Stop MTCH3 | |
| Stop MTCH3 | | | |
| 11101 | P1 | P2 | R |

In Table 5, "P2=0" means that the MSI is the scheduling or demand information.

At step S1104, the OBU sends a demand response message.

The OBU which has received the vehicle demand information determines, according to the position of the OBU, whether to send the response message. If the vehicle is in the demand area or is going to the demand area, and the driver agrees, the OBU returns the response message to the traffic information center; or else, the OBU does not send the response message.

At step S1106, the traffic information center selects the vehicle meeting the condition.

The traffic information center can perform synthetic determination according to the received response message, the location of the vehicle making a response and the traffic condition of the area where the vehicle making a response is to select the vehicle meeting the condition.

At step S1108, the traffic information center sends the vehicle scheduling information through the multicast bearing.

The traffic information center sends the vehicle scheduling information through the multicast bearing, in which the vehicle scheduling information at least includes a vehicle identity. The scheduling information is sent through the multicast bearing aims to prevent multiple vehicles from going to the demand location.

At step S1110, the vehicle scheduled sends the confirmation message to the traffic information center.

After receiving the scheduling information, the vehicle scheduled sends the confirmation message, in which the confirmation message can carry the time of reaching the demand location.

At step S1112, the traffic information center sends the traffic condition information.

The traffic information center can select a route of reaching the demand location according to the location of the vehicle scheduled, and notifies the vehicle scheduled of the traffic information about the route. The traffic information about the route can be sent through the multicast bearing or the unicast bearing.

Figure 12:
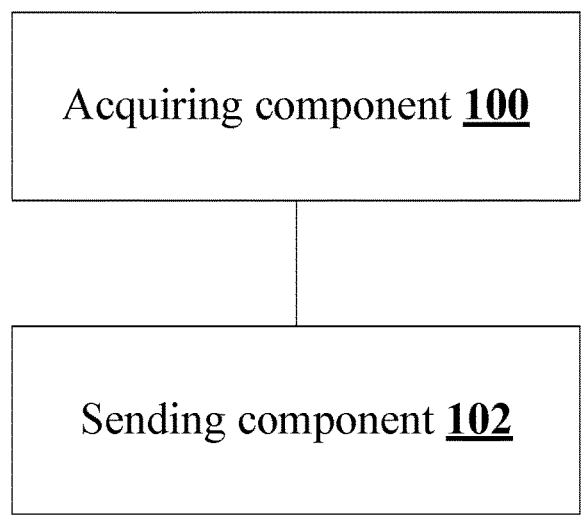
FIG. 12 is a structural block diagram of a device for information identification according to an embodiment of the disclosure.

FIG. 12 is a structural block diagram of a device for information identification according to an embodiment of the disclosure. As shown in FIG. 12, the device for information identification includes an acquiring component 100 and a sending component 102. The acquiring component 100 is configured to acquire the notification message about a start of the traffic information service. The notification message carries the traffic information identifier and the timestamp, the traffic information identifier is the service identifier for indicating the traffic information, and the timestamp indicates a time point when the base station sends the MSI. The sending component 102 is configured to send the MSI according to the notification message. The MSI is indicative of the position information and the expansion information of the sub-frame where the MTCH corresponding to the traffic information is.

By using the device shown in FIG. 12, the problem that when the road traffic condition changes suddenly, the UE needs to monitor all MCCH notification messages, so that the power consumption of the UE is increased and the UE cannot acquire the needed traffic information timely is solved. The technical effect is to reduce the power consumption for the OBU to acquire traffic and scheduling information, and realize that the OBU receives the required traffic information timely.

In one embodiment, the sending component 102 includes a determining element (not shown in the figure) and a sending element (not shown in the figure). The determining element is configured to determine that a service is the traffic information service according to the traffic information identifier. The sending element is configured to send the MSI according to the timestamp.

In an example implementation process, the reserved value of the LCID in the MSI can be used to indicate the traffic information service, in which the reserved value is 11101.

Figure 13:
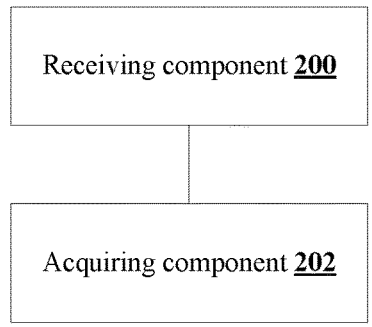
FIG. 13 is a structural block diagram of another device for information identification according to an embodiment of the disclosure.

FIG. 13 is a structural block diagram of another device for information identification according to an embodiment of the disclosure. As shown in FIG. 13, the device for information identification includes a receiving component 200 and an acquiring component 202. The receiving component 200 is configured to receive the MSI from the base station. The acquiring component 202 is configured to acquire the traffic information on the MTCH according to the MSI.

In one embodiment, the acquiring component 200 is configured to read the MTCH data according to the MSI, and determine that the traffic information on the MTCH is required traffic information according to the location information of the traffic information contained in the MTCH data and information about a location where at least one of an OBU and a UE is.

Figure 14:
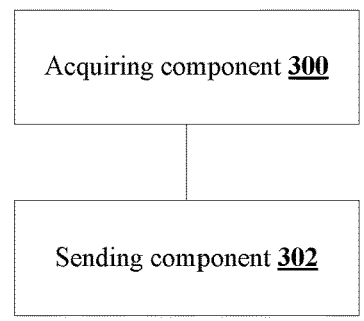
FIG. 14 is a structural block diagram of another device for information identification according to an embodiment of the disclosure.

FIG. 14 is a structural block diagram of another device for information identification according to an embodiment of the disclosure. As shown in FIG. 14, the device for information identification includes an acquiring component 300 and a sending component 302. The acquiring component 300 is configured to acquire the traffic information notification, in which the traffic information notification carries the TMGI which is allocated by the BM-SC. The sending component 302 is configured to send the MCCH message according to the traffic information notification. The MCCH message is indicative of the location information corresponding to at least one of the traffic information and the type of traffic information.

Figure 15:
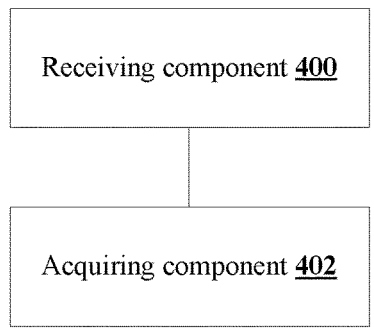
FIG. 15 is a structural block diagram of another device for information identification according to an embodiment of the disclosure.

FIG. 15 is a structural block diagram of another device for information identification according to an embodiment of the disclosure. As shown in FIG. 15, the device for information identification includes a receiving component 400 and an acquiring component 402. The receiving component 400 is configured to receive the MCCH message from the base station. The acquiring component 402 is configured to acquire the MSI and the traffic information on the required MTCH according to the MCCH message.

In one embodiment, the acquiring component 402 may include a determining element (not shown in the figure) and an acquiring element (not shown in the figure). The determining element is configured to determine that the traffic information on the MTCH is the required traffic information according to the TMGI carried in the MCCH message. The acquiring element is configured to read the MSI and the traffic information on the MTCH.

Figure 16:
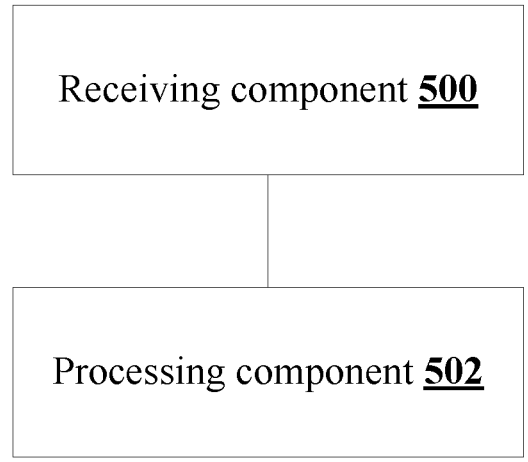
FIG. 16 is a structural block diagram of another device for information identification according to an embodiment of the disclosure.

FIG. 16 is a structural block diagram of another device for information identification according to an embodiment of the disclosure. As shown in FIG. 16, the device for information identification includes a receiving component 500 and a processing component 502. The receiving component 500 is configured to receive the request message from at least one of the OBU and the UE. The processing component 502 is configured to respond to the request message, and send the MSI to at least one of the OBU and the UE. The MSI is indicative of the position information and the expansion information of the sub-frame where the MTCH corresponding to traffic information is.

In one embodiment, the information carried in the request message may include, but is not limited to, at least one of the followings:

(1) the traffic information identifier, which is indicative of the traffic information required by at least one of the OBU and the UE;

(2) the area of the traffic information, which is indicative of the geographical location where the traffic information occurs; and (3) the time window, which is indicative of that the traffic information acquired in the time window being useful information.

Figure 17:
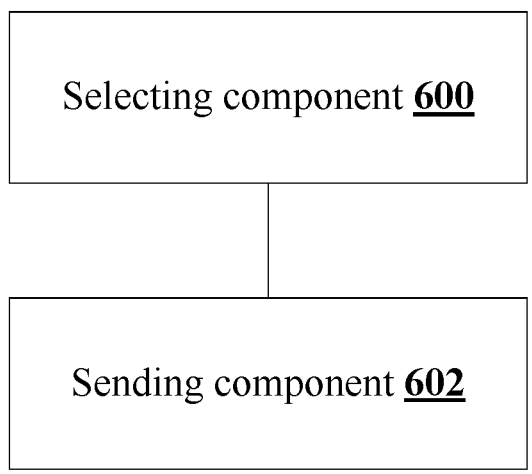
FIG. 17 is a structural block diagram of another device for information identification according to an embodiment of the disclosure.

FIG. 17 is a structural block diagram of another device for information identification according to an embodiment of the disclosure. As shown in FIG. 17, the device for information identification includes a selecting component 600 and a sending component 602. The selecting component 600 is configured to select the vehicle to be scheduled. The sending component 602 is configured to send the traffic information to the vehicle to be scheduled.

In one embodiment, the selecting component 600 includes a first receiving element (not shown in the figure), a first sending element (not shown in the figure), a second receiving element (not shown in the figure) and a selecting element (not shown in the figure). The first sending element is configured to receive the request message from the vehicle to be scheduled. The first sending element is configured to send, according to the request message, the vehicle demand information through the multicast bearing. The second receiving element is configured to receive the demand response message of the vehicle to be scheduled. The selecting element is configured to select the vehicle to be scheduled according to the demand response message, the information about a location where the vehicle to be scheduled is and the information about traffic condition of an area where the vehicle to be scheduled is.

In one embodiment, the sending component 602 may include a second sending element (not shown in the figure), a third receiving element (not shown in the figure) and a fourth sending element (not shown in the figure). The second sending element is configured to send the vehicle scheduling information to the vehicle to be scheduled, in which the vehicle scheduling information carries an identity of the vehicle to be scheduled. The third receiving element is configured to receive the confirmation message from the vehicle to be scheduled. The fourth sending element is configured to send the traffic information to the vehicle to be scheduled according to the confirmation message.

It can be seen from the above description that the above embodiments achieve the following technical effects (note that, these effects can be achieved by some preferred embodiments): a predetermined network element sends notification information, including the traffic information identifier and the timestamp, to the base station eNB. The base station eNB sends indication information for identifying the traffic information in the MSI according to the indication of the timestamp. The OBU which is interested in the traffic information further receives the traffic information on the MTCH according to the indication information in the MSI. The technical effect is to reduce the power consumption for the OBU to acquire traffic and scheduling information, and realize that the OBU receives the required traffic information timely.

Obviously, those skilled in the art should appreciate that the above components and steps of the disclosure can be implemented by a general-purpose computing device. And they can be centralized in a single computing device or distributed on a network composed of multiple computing devices. Optionally, they can be implemented by a program code which is capable of being executed by the computing device, so that they can be stored in a storage device and executed by the computing device. And in some situations, the presented or described steps can be executed in an order different from that described here. Or they are made into integrated circuit components, respectively. Or multiple components and steps of them are made into a single integrated circuit component to realize. In this way, the disclosure is not limited to any particular combination of hardware and software.

The above are the example embodiments of the disclosure and not intended to limit the disclosure. For those skilled in the art, the disclosure may have various modifications and changes. Any modifications, equivalent replacements, improvements and the like as claimed in the claims shall fall within the scope of protection of the disclosure.

INDUSTRIAL APPLICABILITY

As mentioned above, a method and device for information identification provided in the disclosure have the following beneficial effect: the power consumption for the OBU to acquire traffic and scheduling information can be realized, and it is realized that the OBU receives the required traffic information timely.

What is claimed is:

1. A method for information identification, comprising:
  acquiring, by a base station, a notification message about a start of a traffic information service, wherein the notification message carries a traffic information identifier and a timestamp, the traffic information identifier is a service identifier for indicating traffic information, and the timestamp indicates a time point when the base station sends Multicast Channel Scheduling Information (MSI); and
  sending, by the base station, the MSI according to the notification message, wherein the MSI is indicative of position information and expansion information of a sub-frame where a Multicast Traffic Channel (MTCH) corresponding to the traffic information is.

2. The method as claimed in claim 1, wherein sending, by the base station, the MSI according to the notification message comprises:
  determining, by the base station, that a service is the traffic information service according to the traffic information identifier; and
  sending, by the base station, the MSI according to the timestamp.

3. The method as claimed in claim 1, wherein a reserved value of a Logical Channel Identifier (LCID) in the MSI is indicative of the traffic information service, wherein the reserved value is 11101.

4. The method as claimed in claim 1, wherein the MSI which is indicative of the position information and the expansion information of the sub-frame where the MTCH corresponding to the traffic information is comprises: a first MSI record and a second MSI record corresponding to the traffic information, wherein the first MSI record is indicative of the position information of the sub-frame where the MTCH corresponding to the traffic information is, and the second MSI record is to adopt 3 bits in a stop MTCH domain corresponding to the traffic information to indicate the expansion information; the expansion information at least comprises: a type of traffic information.

5. The method as claimed in claim 1, wherein after sending, by the base station, the MSI according to the notification message, the method further comprises:
  receiving, by at least one of an On Board Unit (OBU) and a User Equipment (UE), the MSI from the base station; and
  acquiring, by at least one of the OBU and the UE, the traffic information on the MTCH according to the MSI.

6. The method as claimed in claim 5, wherein acquiring, by at least one of the OBU and the UE, the traffic information on the MTCH according to the MSI comprises:
  reading, by at least one of the OBU and the UE, MTCH data according to the MSI, and determining, by at least one of the OBU and the UE, that the traffic information on the MTCH is required traffic information according to location information of the traffic information contained in the MTCH data and information about a location where at least one of the OBU and the UE is.

7. The method as claimed in claim 1, wherein after sending, by the base station, the MSI according to the notification message, the method further comprises:
  receiving, by at least one of an On Board Unit (OBU) and a User Equipment (UE), an expanded Multicast Control Channel (MCCH) message from the base station; and
  acquiring, by at least one of the OBU and the UE according to the MCCH message, the MSI and the traffic information on a required MTCH.

8. The method as claimed in claim 7, wherein acquiring, by at least one of the OBU and the UE according to the MCCH message, the MSI and the traffic information on the MTCH comprises:
  determining, by at least one of the OBU and the UE, that the traffic information on the MTCH is the required traffic information according to a Temporary Mobile Group Identity (TMGI) carried in the MCCH message; and
  reading, by at least one of the OBU and the UE, the MSI and the traffic information on the MTCH.

9. A method for information identification, comprising:
  receiving a request message from at least one of an On Board Unit (OBU) and a User Equipment (UE); and
  responding to the request message, and sending Multicast Channel Scheduling Information (MSI) to at least one of the OBU and the UE, wherein the MSI is indicative of position information and expansion information of a sub-frame where a Multicast Traffic Channel (MTCH) corresponding to traffic information is.

10. The method as claimed in claim 9, wherein the request message carries at least one of the followings:
  a traffic information identifier, which is indicative of the traffic information required by at least one of the OBU and the UE;
  an area of the traffic information, which is indicative of a geographical location where the traffic information occurs; and
  a time window, which is indicative of the traffic information acquired in the time window being useful information.

11. The method as claimed in claim 9, wherein after responding to the request message, and sending the MSI to at least one of the OBU and the UE, the method further comprises:
  selecting a vehicle to be scheduled; and
  sending traffic information to the vehicle to be scheduled.

12. The method as claimed in claim 11, wherein selecting the vehicle to be scheduled comprises:
  receiving a request message from the vehicle to be scheduled;
  sending, according to the request message, vehicle demand information through multicast bearing;
  receiving a demand response message of the vehicle to be scheduled; and selecting the vehicle to be scheduled according to the demand response message, information about a location where the vehicle to be scheduled is and information about traffic condition of an area where the vehicle to be scheduled is.

13. The method as claimed in claim 11, wherein sending the traffic information to the vehicle to be scheduled comprises:
   sending vehicle scheduling information to the vehicle to be scheduled, wherein the vehicle scheduling information carries an identity of the vehicle to be scheduled;
   receiving a confirmation message from the vehicle to be scheduled; and
   sending the traffic information to the vehicle to be scheduled according to the confirmation message.

14. A device for information identification, comprising: a hardware processor coupled with a memory and arranged to execute program components stored on the memory, wherein the program components comprise:
   an acquiring component to acquire a notification message about a start of a traffic information service, wherein the notification message carries a traffic information identifier and a timestamp, the traffic information identifier is a service identifier for indicating traffic information, and the timestamp indicates a time point when the base station sends Multicast Channel Scheduling Information (MSI); and
   a sending component to send the MSI according to the notification message, wherein the MSI is indicative of position information and expansion information of a sub-frame where a Multicast Traffic Channel (MTCH) corresponding to the traffic information is.

15. The device as claimed in claim 14, wherein the sending component comprises:
   a determining element to determine that a service is the traffic information service according to the traffic information identifier; and
   a sending element to send the MSI according to the timestamp.

16. The device as claimed in claim 14, wherein a reserved value of a Logical Channel Identifier (LCID) in the MSI is indicative of the traffic information service, wherein the reserved value is 11101.

17. The device as claimed in claim 14, wherein the program components further comprises:
   a receiving component to receive a request message from at least one of an On Board Unit (OBU) and a User Equipment (UE); and
   the sending component further to respond to the request message, and send the MSI to at least one of the OBU and the UE.

18. The device as claimed in claim 17, wherein the request message carries at least one of the followings:
   a traffic information identifier, which is indicative of the traffic information required by at least one of the OBU and the UE;
   an area of the traffic information, which is indicative of a geographical location where the traffic information occurs; and
   a time window, which is indicative of that the traffic information acquired in the time window being useful information.

* * * * *